(12) United States Patent
Minium et al.

(10) Patent No.: US 7,437,378 B2
(45) Date of Patent: Oct. 14, 2008

(54) SCHEMA-DOMINANT MAPPING USER INTERFACE

(75) Inventors: Dennis W Minium, Sammamish, WA (US); Matt Curland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/653,406

(22) Filed: Sep. 2, 2003

(65) Prior Publication Data

US 2005/0050089 A1    Mar. 3, 2005

(51) Int. Cl.
*G06F 17/30* (2006.01)
(52) U.S. Cl. .................. 707/102; 707/100; 707/101; 715/700; 715/738; 715/805
(58) Field of Classification Search ............... 707/1–10, 707/100, 102; 715/513, 738, 805
See application file for complete search history.

(56) References Cited

U.S. PATENT DOCUMENTS

| | | | | |
|---|---|---|---|---|
| 6,490,581 B1* | 12/2002 | Neshatfar et al. | .............. | 707/4 |
| 6,823,495 B1* | 11/2004 | Vedula et al. | ............... | 715/805 |
| 2003/0033277 A1* | 2/2003 | Bahulkar et al. | ............... | 707/1 |
| 2003/0149934 A1* | 8/2003 | Worden | ...................... | 715/513 |
| 2003/0179228 A1* | 9/2003 | Schreiber et al. | ............ | 715/738 |
| 2003/0217069 A1* | 11/2003 | Fagin et al. | ................. | 707/102 |
| 2004/0093344 A1* | 5/2004 | Berger et al. | ................ | 707/102 |
| 2005/0050069 A1* | 3/2005 | Vaschillo et al. | ............ | 707/100 |

OTHER PUBLICATIONS

A Survey of approaches to automatic schema matching By Erhard Rahm, Philip A. Bernstein; Pub Nov. 21, 2001.*

* cited by examiner

*Primary Examiner*—Khanh B Pham
(74) *Attorney, Agent, or Firm*—Birch, Stewart, Kolasch & Birch, LLP

(57) ABSTRACT

A scalable graphical user interface that may be used to map two or more schemas is provided. Elements of a dominant schema are displayed in a first column. Elements of a subordinate schema are displayed in a second column. A user may drag elements of the subordinate schema to a third mapping column and position those elements next to mapped dominant schema elements. A user can quickly and conveniently determine a relationship between mapped elements by selecting an element from the dominant schema and identifying one or more elements in the mapping column that are located next to that element.

19 Claims, 5 Drawing Sheets

SCHEMA-DOMINANT MAPPING USER INTERFACE

FIELD OF THE INVENTION

Aspects of the present invention relate to the mapping of schemas. More specifically, aspects of the present invention provide a user interface that shows the relationships between a plurality of schemas.

BACKGROUND

Schemas are commonly used to define the format of documents. For example, a schema may be used to define what elements may be included within an extensible markup language (XML) document. The schema may further describe what order the elements may be in, what content the elements may consist of and what attributes the elements may contain. Other examples of schemas are the description of an object graph used in a computer program or the definition of a database held by a database management system.

It is common for entities to map elements of one schema into elements of another schema. For example, a first company may order a part from a second company. The part order document used by the first company may be formatted in accordance with a first schema, while the second company may use a second document formatted in accordance with a second schema to process the order. In order to create the second document, the second company needs to map elements of the first schema into elements of the second schema.

FIG. 1 illustrates one prior art user interface 100 that is used to map schemas. An order processing document schema 102 is shown next to a part order schema 104. A user maps elements of the subordinate part order schema 104 to elements of the dominant order processing schema 102 by drawing lines to connect the elements. Among other disadvantages, it can be difficult to understand the relationships between schema elements with user interface 100. Even with two relatively simple schemas it can be difficult to follow the lines used to connect elements. This problem is magnified when larger schemas and more lines are used and limits the scalability of user interface 100.

Therefore, there is a need in the art for improved schema mapping user interfaces, systems and methods that accurately show the relationships between schema elements and that are scalable.

BRIEF SUMMARY

Aspects of the present invention address one or more of the issues mentioned above, thereby providing a scalable user interface that may be used to map schemas. Elements of a dominant schema are displayed in a column. Elements of a subordinate schema are displayed in another column. A user may drag elements of the subordinate schema to a mapping column and position those elements next to mapped dominant schema elements. A user can quickly and conveniently determine a relationship between mapped elements by selecting an element from the dominant schema and identifying one or more elements in the mapping column that are located next to that element.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 2:
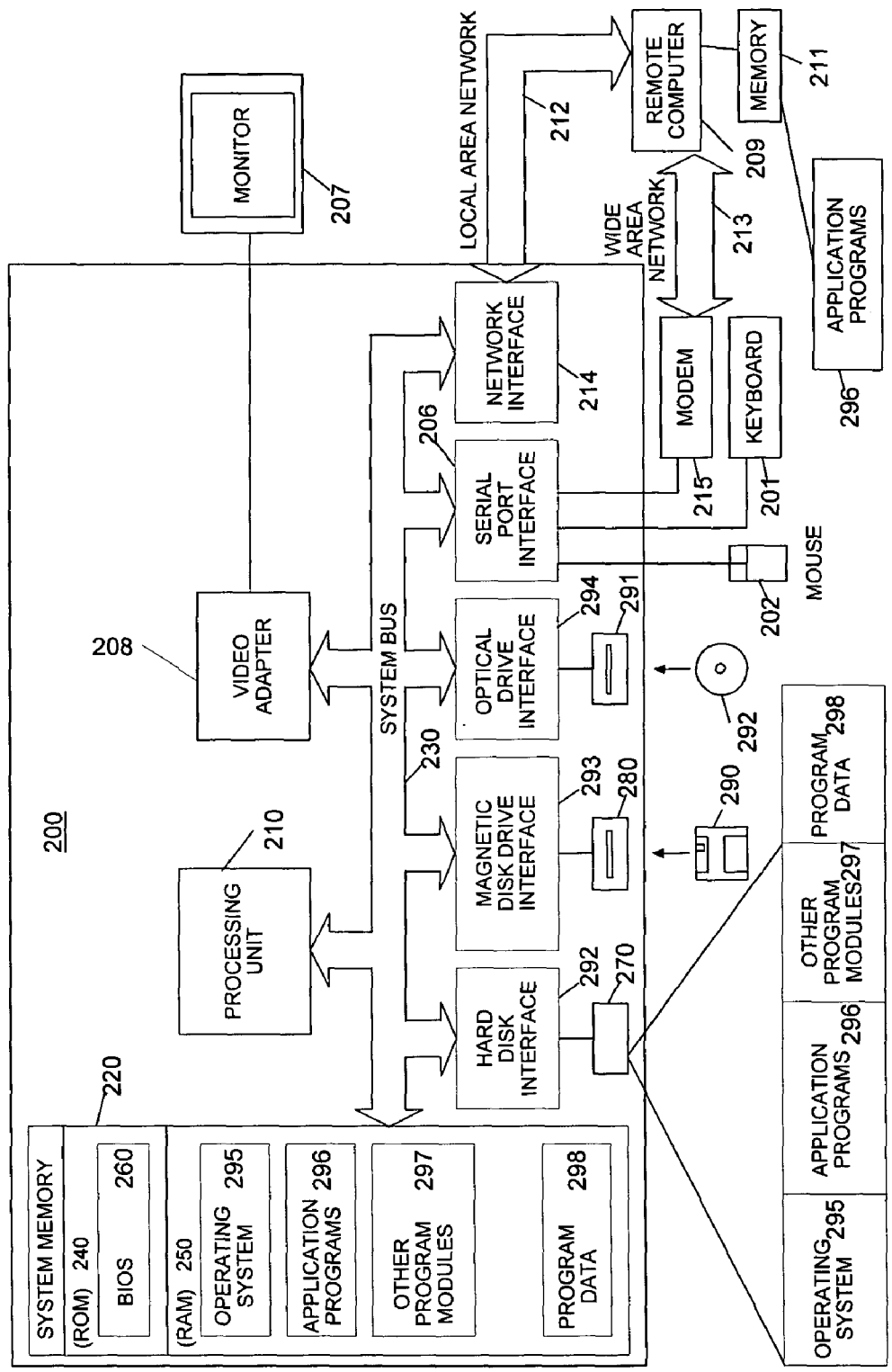
FIG. 2 illustrates a functional block diagram of a conventional general-purpose computer system.

FIG. 2 is a functional block diagram of an example of a conventional general-purpose digital computing environment that can be used to implement a visual design surface in accordance with various aspects of the present invention. In FIG. 2, a computer 200 includes a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory 220 includes read only memory (ROM) 240 and random access memory (RAM) 250.

A basic input/output system 260 (BIOS), containing the basic routines that help to transfer information between elements within the computer 200, such as during start-up, is stored in the ROM 240. The computer 200 also includes a hard disk drive 270 for reading from and writing to a hard disk (not shown), a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 290, optical disk 291, ROM 240 or RAM 250, including an operating system 295, one or more application programs 296, other program modules 297, and program data 298. A user can enter commands and information into the computer 200 through input devices such as a keyboard 201 and pointing device 202. Other input devices (not shown) may include a microphone, joystick, game pad, satellite dish, scanner or the like. These and other input devices are often connected to the processing unit 210 through a serial port interface 206 that is coupled to the system bus, but may be connected by other interfaces, such as a parallel port, game port or a universal serial bus (USB). Further still, these devices may be coupled directly to the system bus 230 via an appropriate interface (not shown). A monitor 207 or other type of display device is also connected to the system bus 230 via an interface, such as a video adapter 208. In addition to the monitor, personal computers typically include other peripheral output devices (not shown), such as speakers and printers.

The computer 200 can operate in a networked environment using logical connections to one or more remote computers, such as a remote computer 209. The remote computer 209 can be a server, a router, a network PC, a peer device or other common network node, and typically includes many or all of the elements described above relative to the computer 200, although only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets and the Internet.

When used in a LAN networking environment, the computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 3:
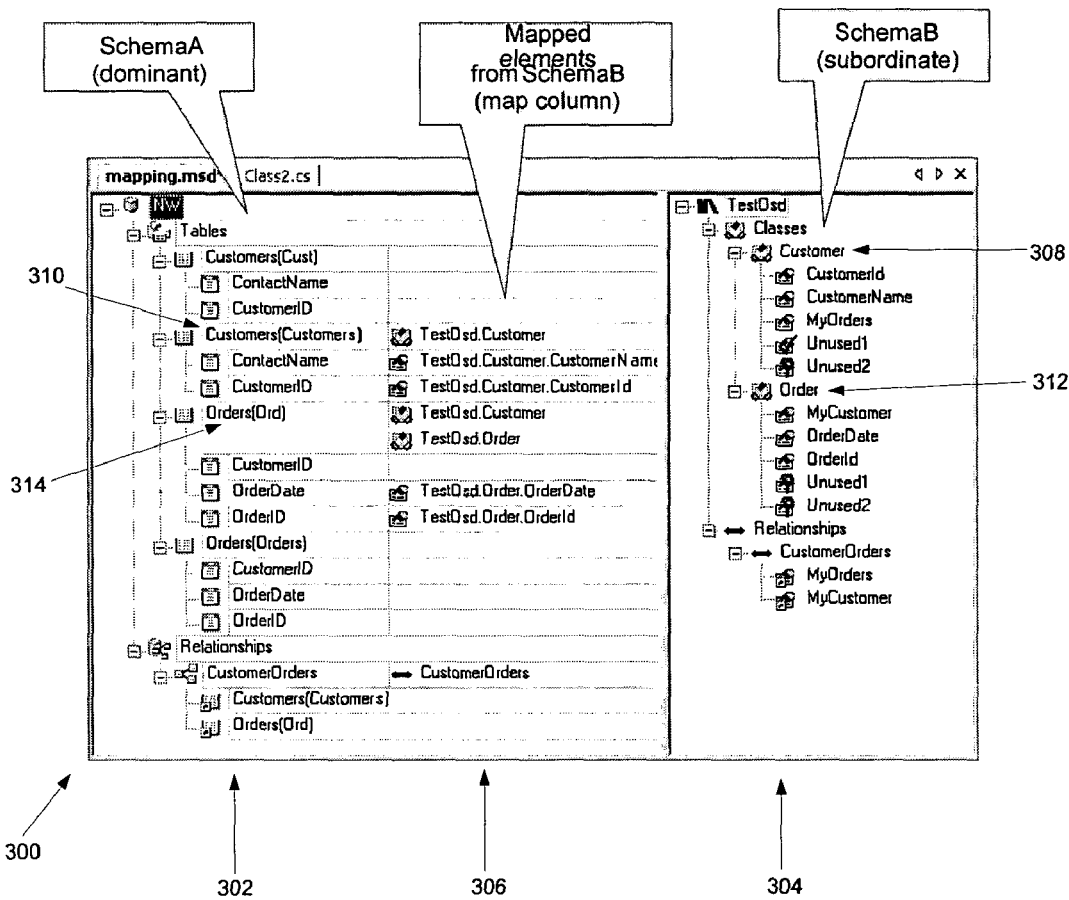
FIG. 3 illustrates a graphical user interface for mapping schemas that includes a mapping column, in accordance with an embodiment of the invention.

FIG. 3 illustrates a graphical user interface 300 for mapping schemas that includes a mapping column, in accordance with an embodiment of the invention. Graphical user interface 300 includes a first column 302 that lists elements of a dominant schema. The elements of a subordinate schema are displayed in another column 304. The dominant schema and/or the subordinate schema may be a database schema. Column 306 includes elements that are mapped from the subordinate schema to the dominant schema. In the embodiment shown in FIG. 3, elements of the dominant schema and the subordinate schema are displayed in tree views in order to show relationships between schema elements. In an alternative embodiment, the elements of the subordinate schema may be displayed in a reverse tree structure, i.e., the elements in column 304 may be right justified.

Before the mapping operation begins, column 306 includes no elements. When mapping elements from the subordinate schema shown in column 304 to elements of the dominant schema shown in column 302, a user may either highlight one of the elements from column 304 and drag a copy of the element to column 306, or highlight one of the elements from column 306 and drag a copy of the element to column 304. For example, the user may map element 308 from column 304 to element 310 in column 302 by selecting element 308 and then dragging a copy of element 308 into column 306 in a position next to element 310. In some embodiments, two or more elements from the subordinate schema in column 304 may be mapped to a single dominant schema element in column 302. For example, elements 308 in 312 are shown in column 306 next to element 314.

Figure 1:
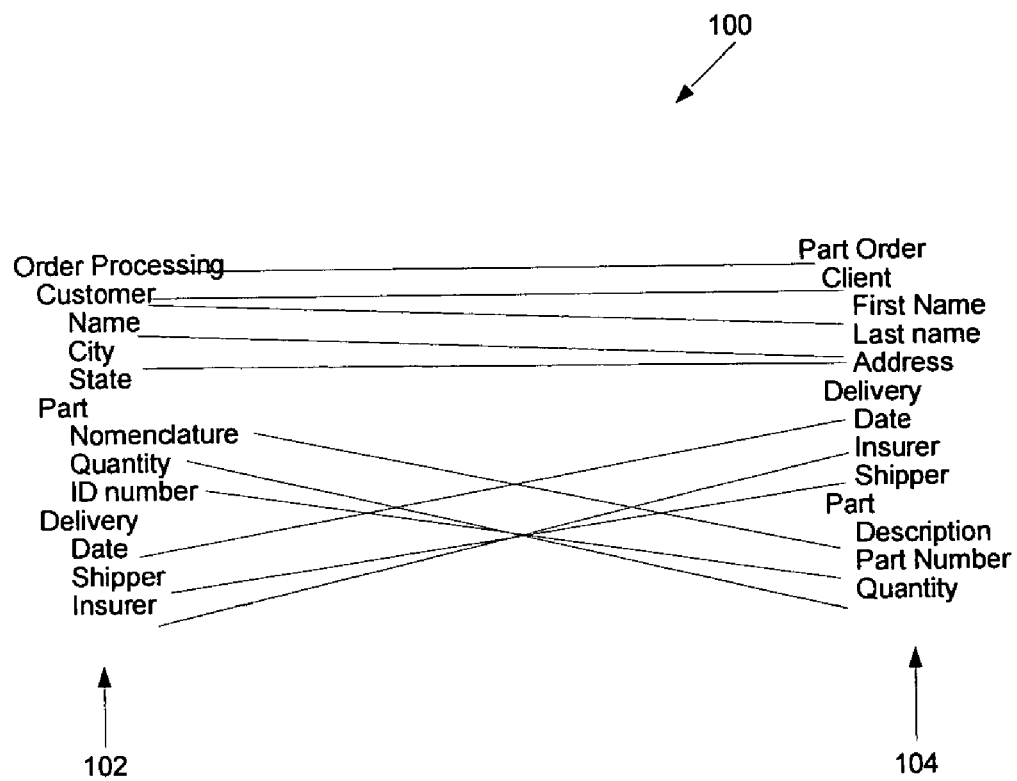
FIG. 1 illustrates a prior art graphical user interface for mapping schemas.

One of the advantages of graphical user interface 300 is that it allows a user to scroll up and down through the dominant schema elements included in column 302 and to clearly see the relevant mapped elements included in column 306. With the prior art user interface shown in FIG. 1, it is common for lines to be connecting elements that are not on the same page. For example, when viewing a dominant schema element, a user may see a line pointing to that element but not see the mapped element from the subordinate schema. When the user scrolls to the subordinate schema element, the dominant schema element is no longer in view.

Figure 4:
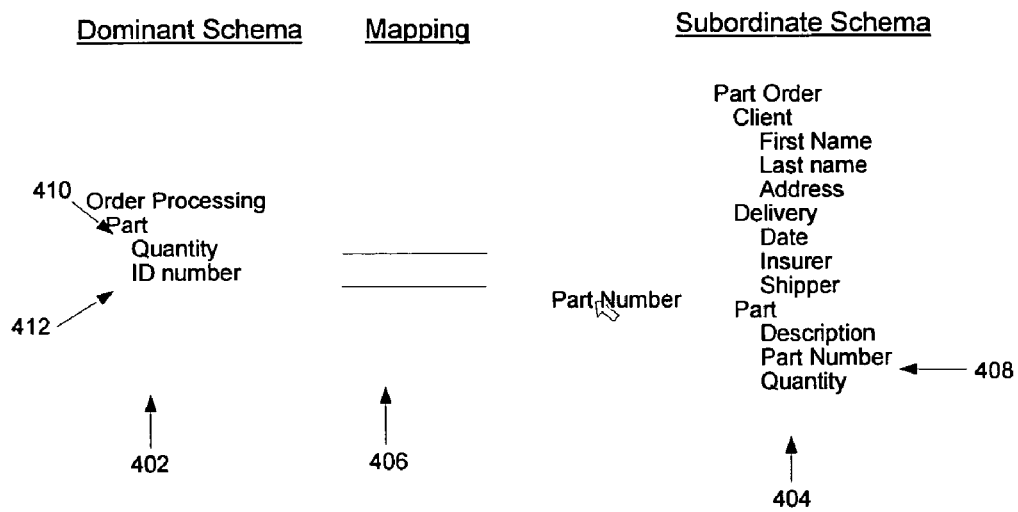
FIG. 4 illustrates a graphical user interface that compares an element selected from a subordinate schema to elements of a dominant schema and displays only compatible elements from the dominant schema, in accordance with an embodiment of the invention.

Aspects of the present invention may assist users when performing mapping operations by comparing attributes and characteristics of schema elements. FIG. 4, for example, illustrates a graphical user interface that compares an element selected from a subordinate schema to elements of a dominant schema and displays only compatible elements from the dominant schema within their containment context, in accordance with an embodiment of the invention. Once an element is selected from the list of subordinate schema elements in column 404, attributes and/or characteristics of that element are compared to attributes and/or characteristics of the dominant schema elements in column 402. For example, when a user selects Part Number element 408, the element is identified as a number. Then, the elements listed in column 402 are analyzed to identify those elements having number data types.

In the example shown, elements 410 and 412 are the elements identified as representing numbers. Next, the dominant schema elements in column 402 that are not identified as being compatible with the selected element are removed from view. This allows a user to quickly identify potential elements to map. In particular, after selecting element 408, the dominant schema elements in column 402 are reduced to the two elements shown. It is readily apparent to the user that element 408 may only be mapped to elements 410 and 412. After the mapping is completed, column 402 may be expanded to show all of the elements of the dominant schema.

Figure 5:
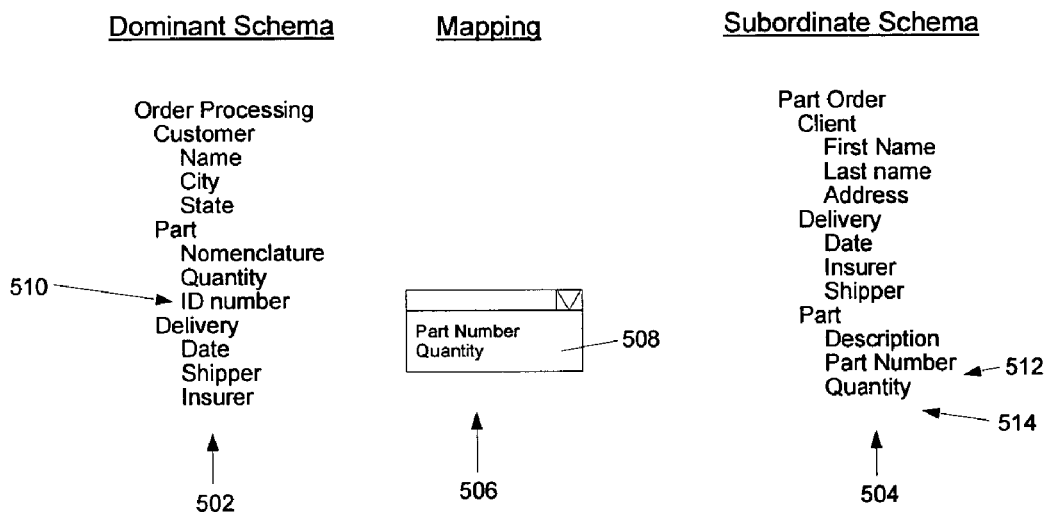
FIG. 5 illustrates a graphical user interface that includes a drop down menu of compatible elements in a mapping column, in accordance with an embodiment of the invention.

FIG. 5 illustrates an alternative embodiment in which a mapping column 506 includes a drop-down menu 508. A user may select one or more drop-down menus from mapping column 506 placed next to dominant schema elements included in column 502. Attributes and/or characteristics of the relevant element of the dominant schema are compared to attributes and/or characteristics of subordinate schema elements listed in column 504. Drop down menu 508 may then list compatible elements. In the embodiment shown, ID number element 510 is identified as a number which is compatible with Part Number element 512 and Quantity element 514 from the subordinate schema. A user may then select one of the elements included in drop-down menu 508 in order to map the selected element to a corresponding dominant schema element. In one alternative embodiment of the invention, the elements included within a drop-down menu do not include elements that have previously been mapped to at least one dominant schema element included in column 502.

The embodiments illustrated in FIGS. 4 and 5 may be implemented with high-speed tree control data structures to facilitate the comparison of elements. Several high-speed tree control data structures are known in the art and may be utilized in connection with practicing aspects of the present invention.

Figure 6:
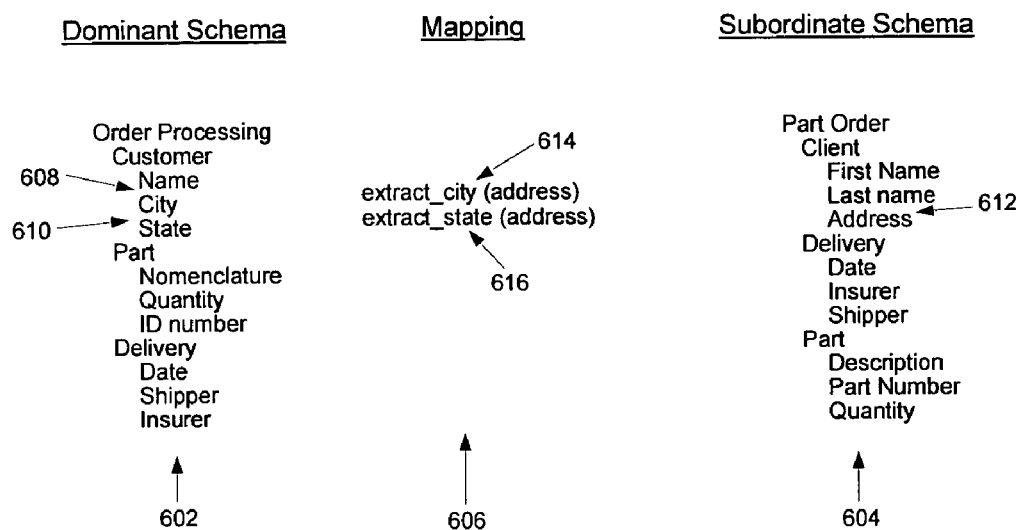
FIG. 6 illustrates a graphical user interface for mapping schemas that includes functions in a mapping column, in accordance with an embodiment of the invention.

It is common for an element in a subordinate schema to not map directly to an element of a dominant schema. FIG. 6 illustrates another embodiment of the invention in which a mapping column may include functions that are used in the mapping process. The dominant schema elements listed in column 602 include a city element 608 and a state element 610, while the subordinate schema elements listed in column 604 include an address element 612. The textual components of address element 612 need to be separated in order to perform a mapping to city element 608 and state element 610. An extract_city function 614 may operate on address element 612 to extract city information. Similarly, an extract state function 616 may be used to extract state information from address element 612. The structure and implementation of such functions is within the skill of a practitioner in the art. One skilled in the art would also appreciate that numerous different types of functions may be used when mapping elements from a subordinate schema to a dominant schema. For example, a function may combine text, convert currencies or perform a variety of different text and mathematical operations. Some functions may operate on elements of a subordinate schema and dominant schema.

In an alternative embodiment (not shown) a second mapping column may be included in one or more of the graphical user interfaces shown above to illustrate the mapping of a dominant schema to a subordinate schema. The second mapping column may be placed to the left or right of the subordinate schema column. A user may also be provided with an option displaying a mapping from a subordinate schema to a dominant schema or a mapping from the dominant schema to the subordinate schema.

One skilled in the art will appreciate that several of the embodiments described above are not mutually exclusive and may be implemented by a single graphical user interface. For example, the features illustrated in FIGS. 4-6 may be implemented with a single graphical user interface.

The present invention has been described in terms of preferred and exemplary embodiments thereof. Numerous other embodiments, modifications and variations within the scope and spirit of the appended claims will occur to persons of ordinary skill in the art from a review of this disclosure. For example, a single dominant schema and a single subordinate schema are shown for illustration purposes only. Aspects of the invention may be used to map a plurality of schemas to one or a plurality of other schemas.

We claim:

1. In a computer system having a graphical user interface including a display and a user interface selection device, a method of mapping elements from diverse schema, the method comprising:
displaying a table comprising three parallel columns including
a first column of elements of a first markup language schema,
a second column of elements of at least one second markup language schema different from the first markup language schema, and a third column of elements;
selecting an element from the at least one second schema;
automatically determining which elements in the first column represent an object similar to the selected element in accordance with a predetermined algorithm;
automatically reducing the elements displayed in the first column to only display elements that are determined to be compatible with the selected element by said step of determining;
displaying the element selected from the at least one second schema in the third column adjacent to the element of the first schema in response to a user action; and
automatically generating a mapping schema between the first and second markup language schema utilizing the third column of elements.

2. The method of claim 1, wherein the first column of elements is displayed in a tree view.

3. The method of claim 2, wherein the second column of elements is displayed in a tree view.

4. The method of claim 1, wherein the at least one second schema comprises two schemas.

5. The method of claim 1, further including:
selecting a second element from the at least one second schema to map to the element of the first schema; and
displaying the second element in the third column of mapped elements in response to a second user action.

6. The method of claim 1, further including:
after the step of displaying an element from the at least one second schema in the third column, automatically expanding the elements in the first column of elements to again display all of the elements of the first schema.

7. The method of claim 1, wherein the step of automatically determining comprises comparing data types.

8. The method of claim 1, further including:
displaying at least one drop down menu in the third column next to an element from the first column, wherein the drop down menu lists elements from the third column that are determined by a predetermined algorithm to be compatible with the element from the first column.

9. The method of claim 1, wherein the third column of elements is located between the first column of elements and the second column of elements.

10. The method of claim 9, further including:
displaying a fourth column of mapped elements, wherein the elements in the fourth column of elements are positioned to represent a mapping of elements from the first schema to the second schema.

11. The method of claim 10, wherein the fourth column of elements is located between the second column of elements and the third column of elements.

12. The method of claim 10, wherein the fourth column of elements is not located next to the third column of elements.

13. The method of claim 1, wherein at least one element in the third column of elements includes a function that acts upon at least one element of the second schema.

14. The method of claim 13, wherein the function combines text from at least two elements of the second schema.

15. The method of claim 13, wherein the function converts currency.

16. The method of claim 13, wherein the function acts upon at least one element of the second schema and at least one element of a first schema.

17. The method of claim 1, wherein the user action is a drag and drop action.

18. The method of claim 1, wherein the user action is a highlighting action.

19. A computer-readable medium containing computer-executable instructions for causing a computer device to perform the steps of:

displaying a table comprising three parallel columns including
- a first column of elements of a first markup language schema,
- a second column of elements of at least one second markup language schema different from the first markup language schema and
- a third column of elements;

selecting an element from the at least one second schema;

automatically determining which elements in the first column represent an object similar to the selected element in accordance with a predetermined algorithm;

automatically reducing the elements displayed in the first column to only display elements that are determined to be compatible with the selected element by said step of determining;

displaying the element selected from the at least one second schema in the third column adjacent to the element of the first schema in response to a user action; and automatically generating a mapping schema between the first and second markup language schema utilizing the third column of elements.

* * * * *